United States Patent
Miguirditchian et al.

(10) Patent No.: US 8,795,611 B2
(45) Date of Patent: Aug. 5, 2014

(54) METHOD FOR PURIFYING THE URANIUM FROM A NATURAL URANIUM CONCENTRATE

(75) Inventors: Manuel Miguirditchian, Avignon (FR); Pascal Baron, Bagnols sur Ceze (FR); Isabelle Bisel, Roquemaure (FR); Binh Dinh, Pont Saint Esprit (FR); Christian Sorel, Villeneuve-les-Avignon (FR); Jean Bertin, Orange (FR)

(73) Assignees: Commissariat a l'Energie Atomique et aux Energies Alternatives, Paris (FR); AREVA NC, Paris (FR)

( * ) Notice: Subject to any disclaimer, the term of this patent is extended or adjusted under 35 U.S.C. 154(b) by 227 days.

(21) Appl. No.: 13/515,499
(22) PCT Filed: Dec. 20, 2010
(86) PCT No.: PCT/EP2010/070248
§ 371 (c)(1),
(2), (4) Date: Jun. 12, 2012
(87) PCT Pub. No.: WO2011/076739
PCT Pub. Date: Jun. 30, 2011

(65) Prior Publication Data
US 2012/0247276 A1 Oct. 4, 2012

(30) Foreign Application Priority Data
Dec. 22, 2009 (FR) ...................................... 09 59380

(51) Int. Cl.
*C01G 43/00* (2006.01)
(52) U.S. Cl.
USPC .......................................................... 423/9
(58) Field of Classification Search
None
See application file for complete search history.

(56) References Cited

U.S. PATENT DOCUMENTS

| | | | |
|---|---|---|---|
| 4,772,429 A * | 9/1988 | Descouls et al. | 252/625 |
| 5,132,092 A | 7/1992 | Musikas et al. | |
| 2009/0184051 A1 | 7/2009 | Heres et al. | |

FOREIGN PATENT DOCUMENTS

| | | |
|---|---|---|
| EP | 0 381 579 A1 | 8/1990 |
| FR | 2 642 561 A1 | 8/1990 |
| FR | 2 642 562 A1 | 8/1990 |
| JP | 2005-214706 | 8/2005 |
| WO | WO 2007/118904 A1 | 10/2007 |

OTHER PUBLICATIONS

Al-Jallo et al., Synthesis and Properties of Some N,N-Dialkylamides as New Extractants, J. Chem. Eng. Data, 1984, pp. 479-481, 29.
Gasparini et al., Application of N,N, Dialkyl Aliphatic Amides in the Separation of Some Actinides, Separation Science and Technology, 1980, pp. 825-844, 15(4).
Jha et al., Third phase formation studies in the extraction of Th(IV) and U(VI) by N,N-diakyl aliphatic amides, Desalination, 2008, pp. 225-233, 232.

* cited by examiner

*Primary Examiner* — Steven Bos
(74) *Attorney, Agent, or Firm* — Miles & Stockbridge P.C.

(57) ABSTRACT

A method with which uranium from a natural uranium concentrate may be purified, including
a) extracting the uranium present as uranyl nitrate in an aqueous phase A1 resulting from the dissolution of the natural uranium concentrate in nitric acid, by means of an organic phase which contains an extractant in an organic diluent;
b) washing the organic phase obtained at the end of step a), with an aqueous phase A2; and
c) stripping the uranyl nitrate of the organic phase obtained at the end of step b), by circulating this organic phase in an apparatus, as a counter current against an aqueous phase A3.
The extractant is an N,N-dialkylamide and the ratio between the flow rate at which the organic phase obtained at the end of step b) and the aqueous phase A3 circulate in the apparatus where step c) occurs, is greater than 1.

15 Claims, 4 Drawing Sheets

METHOD FOR PURIFYING THE URANIUM FROM A NATURAL URANIUM CONCENTRATE

TECHNICAL FIELD

Figure 1:
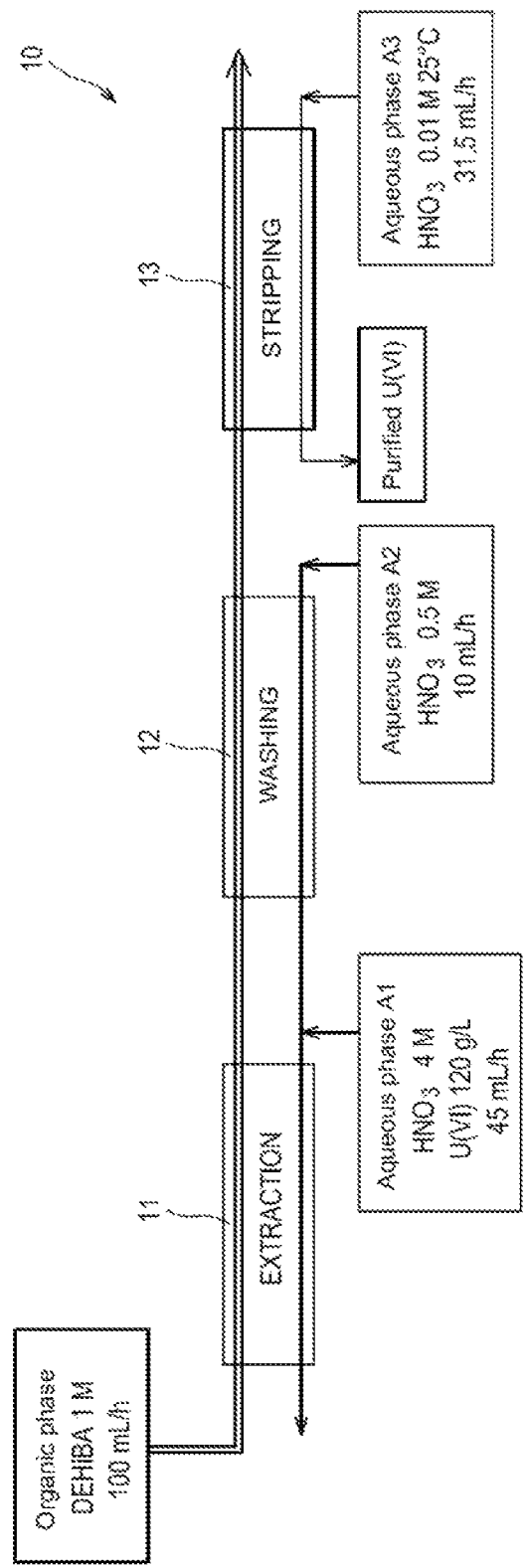

The present invention relates to a method allowing purification of uranium from a concentrate of natural uranium.

It finds application in the field of refining concentrates of natural uranium which are produced by uranium mines and the uranium which they contain is notably intended after purification to be converted either into uranium metal, or into uranium compounds such as for example uranium hexafluoride (or $UF_6$), uranium tetrafluoride (or $UF_4$), uranium dioxide (or $UO_2$) or triuranium octoxide ($U_3O_8$), which are intermediate products from the manufacturing of nuclear fuels.

STATE OF THE PRIOR ART

Plants for refining natural uranium concentrates use in order to bring the uranium contained in these concentrates to so-called <<nuclear>> purity, a method which, after dissolution of said concentrates in nitric acid in order to obtain an aqueous solution of impure uranyl nitrate, comprises:
  extracting this nitrate by an organic phase containing an extractant having high affinity for it, in an organic diluent, and then
  washing the organic phase obtained at the end of this extraction, with an aqueous phase in order to remove from the organic phase undesirable chemical species which may have been extracted with the uranyl nitrate, and
  stripping uranyl nitrate from the thereby washed organic phase so as to recover uranyl nitrate in an aqueous phase.

These three operations are carried out in liquid-liquid extraction apparatuses, for example stirred columns.

The extractant used is tri-n-butyl phosphate (or TBP) which is also used as an extractant in the processing of irradiated nuclear fuels and which was selected by all the refiners as being the most adapted to selectivity, water solubility, chemical stability, density, corrosion, toxicity and safety constraints imposed by the method.

Nevertheless, this purification method has a certain number of drawbacks which are inherent to the use of this extractant.

The first of these drawbacks is that, in the apparatus in which the extraction operation is carried out, there occurs an accumulation of thorium (an impurity present in uranium ores) which is due to an extraction/stripping loop for this element in this apparatus. Indeed, as thorium is also itself extractable by TBP, it is extracted in the area of the apparatus where the organic phase has a low concentration of uranyl nitrate and then stripped from this phase in the area of the apparatus where the organic phase is saturated with uranyl nitrate.

This accumulation of thorium causes a dose rate peak due to the irradiation generated by metastable proactinium 234 ($^{234m}Pa$), after decay of thorium 234 present in the impure uranyl nitrate solution, which is a direct offspring of uranium 238.

In order to avoid the occurrence of such a dose rate peak, it is known how to add to the impure uranyl nitrate solution agents capable of complexing thorium during the extraction operation, which may be fluorides or phosphates. However, the presence of these complexing agents in the produced aqueous effluents adds constraints to exploitation of the method and to management of these effluents, of the type: pollution of the regenerated nitric acid and distillates, corrosion of the equipment used, precipitations, etc.

Another drawback is that the stripping operation is relatively difficult to perform because of a non-negligible extraction of the uranium by TBP, even at low acidity. It is therefore necessary to heat to at least 50° C. the aqueous phase which is used for performing this operation, typically distilled water, and to use substantial aqueous flow rates for obtaining quantitative stripping of uranyl nitrate.

In addition to the fact that the use of an aqueous phase having a temperature of at least 50° C. is a penalty for the safety of the installations because of the risks of flammability of the organic phase, the use of substantial aqueous flows is expressed by substantial dilution of uranyl nitrate. Thus, when the uranyl nitrate concentration is initially of the order of 400 g/L in the impure uranyl nitrate solution, it is at best 130 g/L in the aqueous phase stemming from the stripping operation. The organic phase saturated with uranium, contains about 150 g/L of uranium at the extraction outlet. In order to avoid uranium leaks in this organic phase, the maximum ratio of the O/A (organic over aqueous) flow rates upon stripping is less than 1 (of the order of 0.8) even at 60° C.

As stripping does not sufficiently concentrate, it is therefore necessary to then submit this aqueous phase to a concentration operation which is costly in energy before subsequent processing by denitration.

Finally, because of the non-negligible solubility of TBP in an acid aqueous phase, it would be necessary to wash the aqueous effluents from the extraction and washing operations with an organic diluent in order to recover the TBP present in these effluents and avoid in this way an overconsumption of extractant.

Considering the foregoing, the inventors therefore set a goal of providing a method which, while allowing highly efficient purification of the totality of the uranium contained in a natural uranium concentrate, is without the aforementioned drawbacks.

DISCLOSURE OF THE INVENTION

This object and further other ones are achieved by the present invention which proposes a method allowing purification of uranium from a natural uranium concentrate containing at least one of the following impurities: thorium, molybdenum, zirconium, iron, calcium and vanadium, which method comprises:

a) extracting the uranium present as uranyl nitrate in an aqueous phase A1 resulting from the dissolution of said natural uranium concentrate in nitric acid, by putting this aqueous phase in contact with an organic phase non-miscible with water, which contains an extractant in an organic diluent, and then separating said aqueous and organic phases;

b) washing the organic phase obtained at the end of step a), by putting this organic phase in contact with an aqueous phase A2 and then separating said organic and aqueous phases; and c) stripping the uranyl nitrate from the organic phase obtained at the end of step b), this stripping being carried out by circulating this organic phase in an apparatus, as a countercurrent to an aqueous phase A3, and separating said organic and aqueous phases;

and is characterized in that, on the one hand, the extractant contained in the organic phase is an N,N-dialkylamide and, on the other hand, the ratio between the flow rates at which the organic phase obtained at the end of step b) and the aqueous phase A3 circulate in the apparatus where step c) occurs, is greater than 1 so that stripping of the uranyl nitrate is accompanied by concentration of this nitrate.

Thus, the method of the invention repeats the three main operations (extraction, washing, stripping) of the purification method of the prior art but uses an N,N-dialkylamide as an extractant, instead of TBP.

It should be noted that the use of an organic phase containing an N,N-dialkylamide for extracting the uranium from an aqueous phase in which it is found is not novel per se. Thus, for example, it was proposed for extracting uranium and/or plutonium present in aqueous solutions resulting from the dissolution of irradiated nuclear fuels (French patent application published under number 2 642 562 [2]) as well as for extracting the uranium present in thorium-concentrated aqueous solutions since it is produced by irradiation of this thorium (French patent application published under number 2 642 561 [2]).

On the other hand, what is quite novel is the fact of using an organic phase containing an N,N-dialkylamide for purifying the uranium from a uranium mining concentrate, and what is unexpected is that this use gives the possibility of both:

- avoiding accumulation of the thorium observed when the extraction operation is carried out by means of an organic phase containing TBP and, hence suppressing the requirement of using complexing agents with all the advantages involved by this suppression, in particular in terms of simplification of the exploitation of the method and of the management of the generated aqueous effluents;
- carrying out the stripping operation at lower temperatures than the ones used in the purification method of the prior art, even if it may nevertheless be performed at temperatures from 50 to 60° C., and by using aqueous phase flow rates below those which are required when the organic phase contains TBP, and hence alleviating the subsequent concentration operation with there also all the advantages implied by this alleviation, in particular in terms of energy savings;
- limiting the extractant losses in the aqueous phase because of the low solubility of N,N-dialkylamides in an aqueous phase, and facilitating the processing of extraction raffinates for recycling nitric acid in the method.

As N,N-dialkylamides, it is notably possible to use those which fit the formula (I) hereafter:

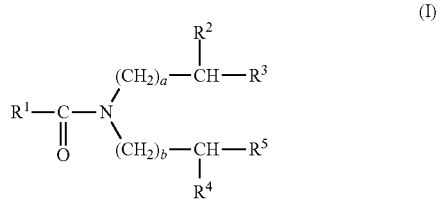

wherein:
- $R^1$ represents an alkyl group, branched in the alpha or beta position of the carbonyl group and comprising from 3 to 12 carbon atoms;
- $R^2$ and $R^4$, which may be identical or different, represent a linear or branched alkyl group comprising from 2 to 4 carbon atoms;
- $R^3$ and $R^5$, which may be identical or different, represent a linear or branched alkyl group comprising from 1 to 6 carbon atoms; and
- a and b, which may be identical or different, are integers ranging from 1 to 6.

Among these N,N-dialkylamides, it is preferable to use those in which a and b both have the value 1 and wherein $R^2$ and $R^4$ both represent an ethyl group like N,N-di-(2-ethylhexyl)isobutyramide (or DEHiBA, wherein $R^1$=—CH$(CH_3)_2$ and $R^3$=$R^5$=—$(CH_2)_3CH_3$), N,N-di-(2-ethylhexyl)-2,2-di-methylpropanamide (or DEHDMPA, wherein $R^1$=—$C(CH_3)_3$ and $R^3$=$R^5$=—$(CH_2)_3CH_3$) or further N,N-di-(2-ethylhexyl)-3,3-dimethylbutanamide (or DEHDMBA, wherein $R^1$=—$CH_2C(CH_3)_3$ and $R^3$=$R^5$=—$(CH_2)_3CH_3$), DEHiBA being most preferred.

As to the organic diluent, this is preferably an isoparaffin or a mixture of isoparaffins, the carbon chain of which comprises from 9 to 13 carbon atoms of the type of those marketed by TOTAL under the commercial reference Isane IP 185.

However, it is also possible to use other aliphatic organic diluents such as kerosene or a linear or branched dodecane, such as n-dodecane and hydrogenated tetrapropylene (or TPH).

In all the cases, the concentration of the N,N-dialkylamide in the organic diluent is preferably from 1 to 2 mol/L.

The aqueous phase A1 preferably contains from 0.5 to 4 mol/L of nitric acid.

The aqueous phase A2 is preferably water, preferentially distilled water, or an aqueous solution containing from 0.01 to 1.5 mol/L of nitric acid or else further a fraction of the aqueous phase obtained at the end of step c).

As to the aqueous phase A3, it may either be water, preferentially distilled water, or an aqueous solution of nitric acid of low concentration, i.e. not containing preferably more than 0.01 mol/L of nitric acid.

According to the invention this aqueous phase A3 may be used at room temperature, i.e. at a temperature typically ranging from 20 to 25° C., but it may also be heated to a temperature of 50 to 60° C. like in the purification method of the prior art.

As indicated earlier, in step c), the ratio between the flow rates at which the organic phase obtained at the end of step b) and the aqueous phase A3 circulate in the apparatus where step c) occurs, is greater than 1 and preferably equal to or greater than 1.5.

The method of the invention may be applied in all the types of apparatuses conventionally used in the field of liquid-liquid extractions such as batteries of mixers-decanters, pulsed or stirred columns, centrifugal extractors, etc.

In addition to the advantages mentioned earlier, the method of the invention further has other advantages such as the fact that, on the one hand, the degradation products of the N,N-dialkylamides are much less a nuisance than the degradation products of TBP and, in particular di-n-butyl phosphate which very strongly complexes certain metal cations, and, on the other hand, the N,N-dialkylamides are totally incinerable since they only consist of carbon, oxygen, nitrogen and hydrogen atoms, which is not the case of TBP.

Other features and advantages of the invention will become apparent from the further description which follows and which relates to experimental tests with which the method of the invention may be validated.

It is obvious that this further description is only given as an illustration of the object of the invention and should by no means be interpreted as a limitation of this object.

SHORT DESCRIPTION OF THE FIGURES

FIG. 1 schematically illustrates a first test for applying the method of the invention in batteries of mixers-decanters.

Figure 2:
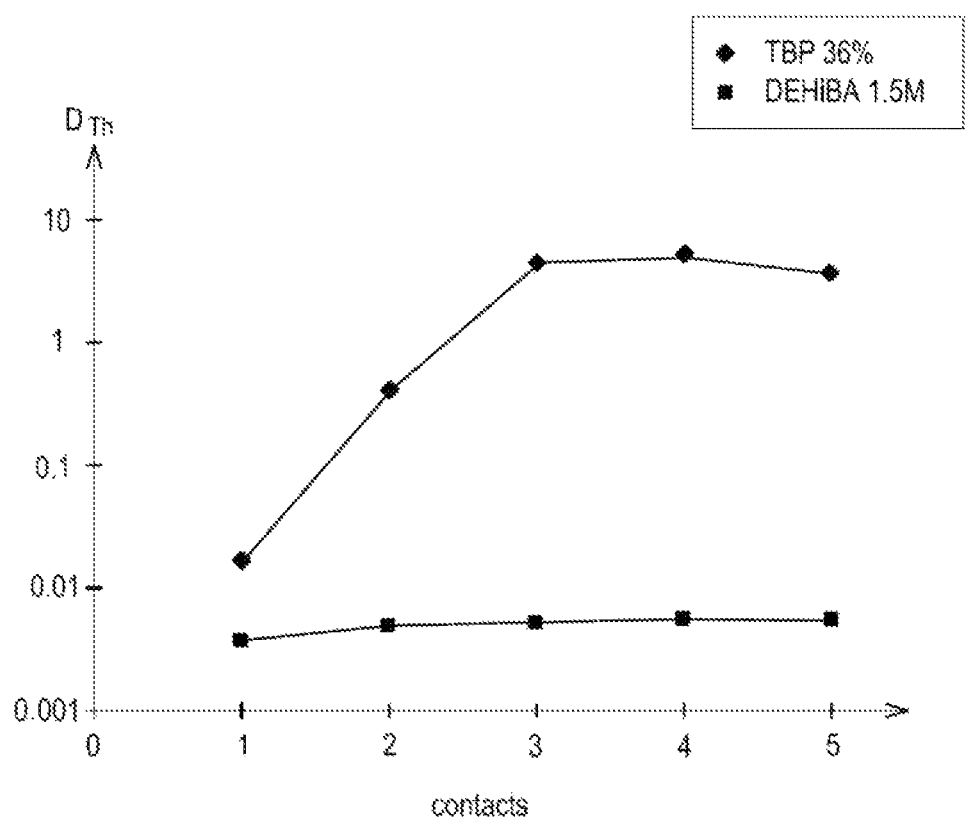

FIG. 2 shows the values of the distribution coefficient of thorium 234, noted as $D_{Th}$, as observed during tests in tubes consisting of depleting an aqueous solution of uranium, containing 2 mol/L of nitric acid, by means of five organic phases either containing DEHiBA or TBP in Isane IP 185.

Figure 3:
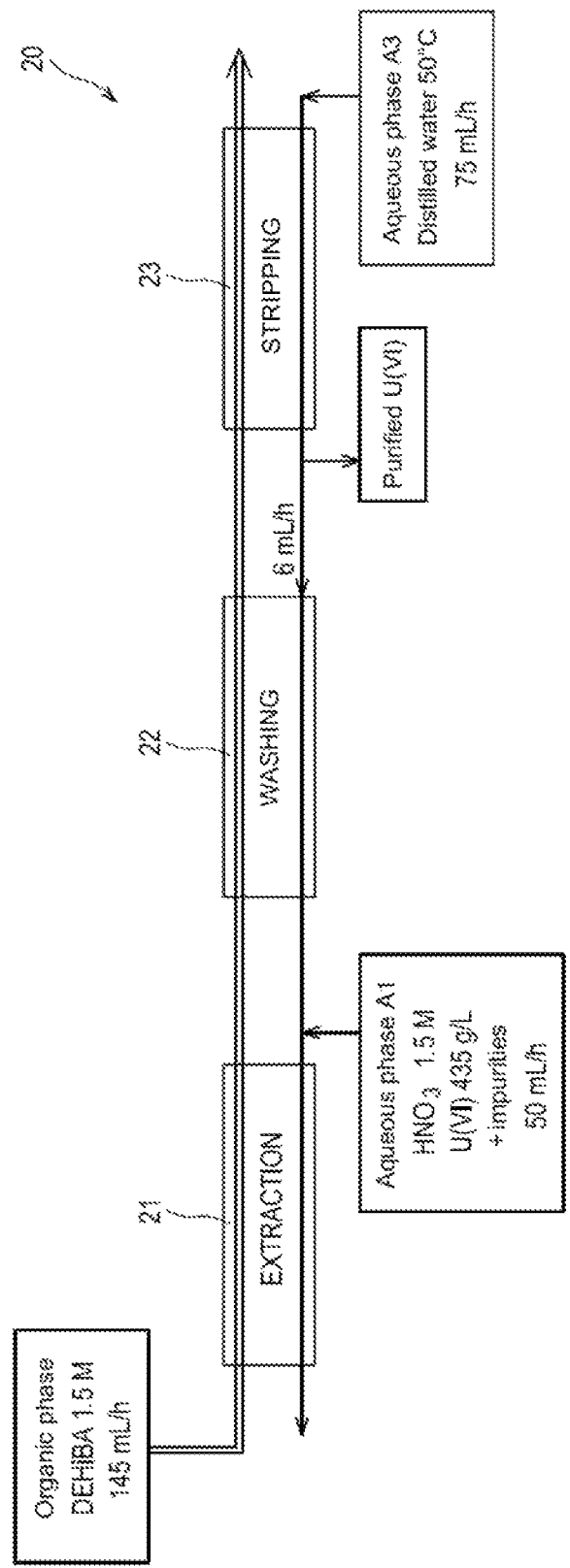

FIG. 3 schematically illustrates another test for applying the method of the invention in batteries of mixers-decanters.

Figure 4:
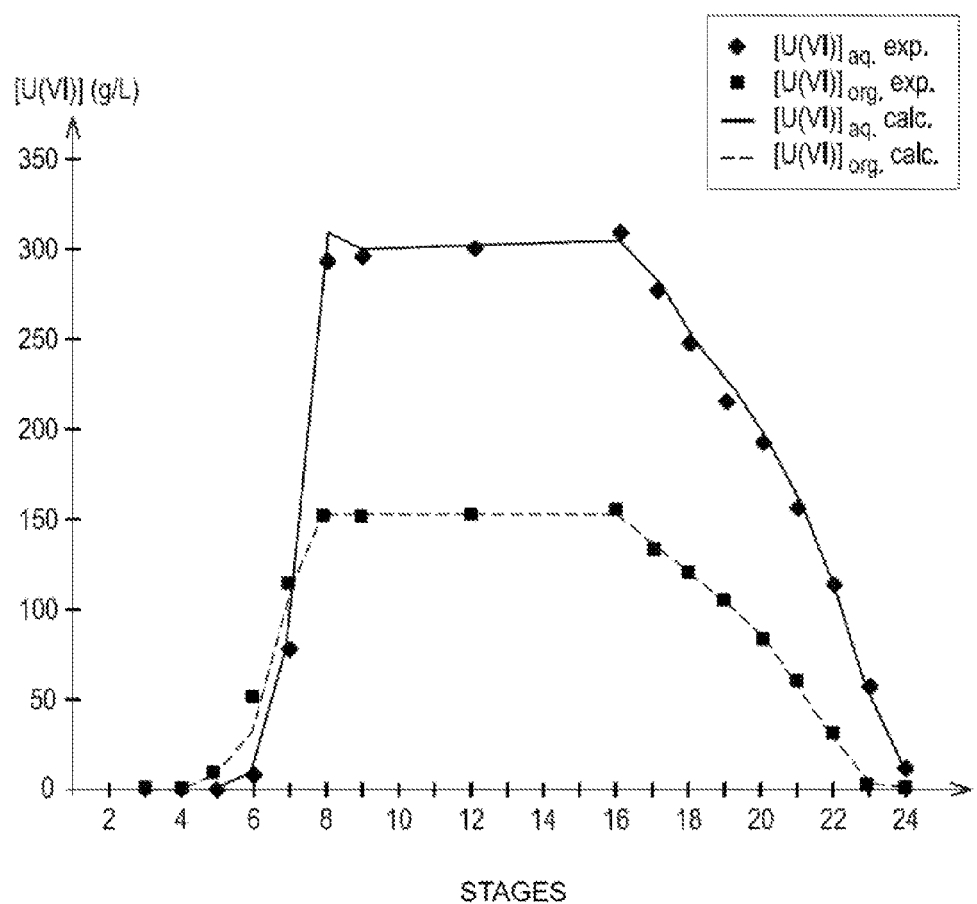

FIG. 4 shows the profiles of the uranium concentrations in the aqueous and organic phases as obtained experimentally and by calculations in different stages of the mixers-decanters used in the test illustrated in FIG. 3.

DETAILED DISCUSSION OF THE INVENTION

Example 1

First of all reference is made to FIG. 1 which schematically illustrates a first test for applying the method of the invention in batteries of mixers-decanters.

This test was conducted in an installation 10 comprising:
- a first battery, referenced as 11, of 16 mixers-decanters, dedicated to the extraction of uranyl nitrate from the aqueous phase A1;
- a second battery, referenced as 12, of 8 mixers-decanters, dedicated to the washing of the organic phase obtained at the end of the extraction; and
- a third battery, referenced as 13, of 16 mixers-decanters, dedicated to the stripping of uranyl nitrate from the organic phase obtained at the end of the washing of this phase.

Were used:
- as an organic phase: a phase containing 1 mol/L of DEHiBA in TPH and circulating at a flow rate of 100 mL/hour in three batteries of mixers-decanters;
- as an aqueous phase A1: a solution of 4 mol/L of nitric acid and 120 g/L of uranium (in the form of uranyl nitrate), and circulating at a flow rate of 45 mL/hour in the battery 11;
- as an aqueous phase A2: a solution of nitric acid at 0.5 mol/L, circulating at a flow rate of 10 mL/hour in the battery 12 and being added at this same flow rate to the aqueous phase A1 in the battery 11; and
- as an aqueous phase A3: a solution of nitric acid at 0.01 mol/L and circulating at a flow rate of 31.5 mL/hour in the battery 13.

The ratios of the O/A (organic over aqueous) flow rates in the batteries 11, 12 and 13 therefore being 1.8, 10 and 3, respectively.

All the phases, including the aqueous phase A3, were used at 25° C.

After 700 hours of operating the installation, the test showed that it is possible to recover in the aqueous phase exiting the battery 13, more than 99.9% of the uranyl nitrate initially present in the aqueous phase A1 and at a concentration much greater than the one it has in the aqueous phase A1, i.e. 160 g/L versus 120 g/L, i.e. a concentration factor of 1.3.

The organic phase exiting from the battery 12 contains about 54 g/L of uranium, which is quantitatively stripped in the battery 13 by using a ratio of O/A flow rates of 3 for obtaining a solution with 160 g/L of uranium.

The low extractability of uranium with DEHiBA, at low nitric acidity, therefore makes possible a stripping <<with concentration>> of the uranyl nitrate at the temperature of 25° C., while it is impossible to obtain if the organic phase contains TBP and this, even by heating the aqueous phase used for carrying out this stripping.

Example 2

The solubility of DEHiBA in an aqueous phase was appreciated by conducting a test in mixers-decanters similar to the one described in Example 1 hereinbefore and by measuring the total organic carbon (or TOC) present in the aqueous phase exiting the battery 11 (called <<extraction raffinate>> hereafter) on the one hand and, in the aqueous phase exiting the battery 13 and containing the purified uranyl nitrate (called <<U production>> hereafter) on the other hand.

The total organic carbon was measured by means of a thermal TOC-meter in the aqueous phases as obtained after decantation, i.e. without submitting these phases to any centrifugation.

Table 1 hereafter shows for both tested aqueous phases, their acidity, the TOC value obtained and the conversion of this value into DEHiBA equivalent, this conversion having been carried out starting from the assumption that the whole organic carbon present in the aqueous phases stems from this extractant.

TABLE 1

| Aqueous phase | Extraction raffinate | U Production |
| --- | --- | --- |
| $HNO_3$ (mol/L) | 3.1 | 0.34 |
| TOC (mg/L) | 31 | 46 |
| DEHiBA equivalent (mol/L) | $1.3 \cdot 10^{-4}$ | $1.9 \cdot 10^{-4}$ |

This table shows that about 40 to 60 mg/L of DEHiBA would be soluble in an aqueous phase under the conditions of the test.

These solubility values are greater than the solubility of DEHiBA in an aqueous phase as announced in the literature by Al-Jallo et al. (*J. Chem. Eng. Data* 1984, 29, 479-481 [3]) and by Gasparini and Grossi (*Separation Science and Technology* 1980, 15(4), 825-844 [4]) but they include the solubility of the extractant itself, that of the organic diluent (TPH) as well as non-negligible phenomena carrying away the organic phase into the aqueous solutions at the outlet of the battery of mixers-decanters.

These solubility values nevertheless remain smaller than the intrinsic solubility of TBP under the same conditions, which is from 200 to 300 mg/L, and confirm that the losses of extractant in the aqueous phase are much smaller in the case when the organic phase contains DEHiBA.

Example 3

The selectivity of DEHiBA for uranium relatively to the impurities which are in majority present in natural concentrates of uranium or which are a penalty in the subsequent steps for converting and enriching the uranium, was also appreciated by conducting two series of tests.

The first series of tests consisted of determining the distribution coefficients of thorium(IV), molybdenum(VI), zirconium(IV), iron(III), calcium(II) and vanadium(V) at the end of a single contact in tubes between a solvent phase containing 1.5 mol/L of DEHiBA in Isane IP 185 and nitric acid solutions containing these cations, either in the presence or not of 30 g/L of uranium, and having different acidities (from 0.5 to 4 M).

For each test, the aqueous and organic phases were put into contact, volume to volume, and left with stirring for 1 hour, at a constant temperature of 25° C. Next, after decantation and separation of these phases, the concentration of cations was determined in the aqueous phase and in the organic phase by atomic emission spectrometry (or ICP-AES).

This first set of tests was able to show that with or without uranium and in the investigated range of nitric acidities, the distribution coefficients of molybdenum, zirconium, iron, calcium and vanadium are less than $10^{-3}$ and lead to U/impurities separation factors greater than 10,000, i.e. greatly sufficient for reaching the specifications of the ASTM C 788 standard in terms of purification of uranyl nitrate.

The distribution coefficient of thorium(IV) is also very small (less than $5.10^{-3}$) for a nitric acid content of 4 mol/L and this, regardless of the uranium concentration of the aqueous phase, confirming the strong selectivity of DEHiBA for uranium relatively to thorium(IV).

The second series of tests consisted of depleting an aqueous solution containing 360 g/L of uranium and 2 mol/L of nitric acid by putting this aqueous solution in contact, in tubes, with successively five organic phases either containing 1.5 mol/L of DEHiBA or 36% (v/v) of TBP in Isane IP 185 and of determining after each contact, the distribution coefficient of the thorium 234 stemming from the decay of uranium 238.

For the first two contacts, the aqueous and organic phases were used in an amount of one volume of aqueous phase for two volumes of organic phase, while for the last three contacts, the aqueous and organic phases were used, volume to volume. In all the cases, the aqueous and organic phases were left with stirring for 10 minutes at a constant temperature of 25° C.

After decantation and separation of the aqueous and organic phases, the activity of thorium 234 was determined in each of these phases by γ spectrometry.

The results of this second series of tests are illustrated in FIG. 2 which shows the values of the distribution coefficient of thorium 234, noted as $D_{Th}$, obtained at the end of each contact and for both types of organic phases.

This figure shows that in the case when the organic phases contain TPB, $D_{Th}$ becomes greater than 1 after the 3$^{rd}$ contact, i.e. after uranium depletion of the aqueous phase, while, in the case when the organic phases contain DEHiBA, $D_{Th}$ is maintained at a value of less than $10^{-2}$ even after uranium depletion of the phase.

Thus, the accumulation of thorium, which is produced in the extraction apparatus in the purification method of the prior art and the simulation of which was made possible by the tests described above, should not occur in the method of the invention.

Example 4

Reference is now made to FIG. 3 which schematically illustrates another test for applying the method of the invention in batteries of mixers-decanters.

This test was carried out in an installation 20 comprising:
- a first battery, referenced as 21, of 8 mixers-decanters, dedicated to the extraction of uranyl nitrate from the aqueous phase A1;
- a second battery, referenced as 22, of 8 mixers-decanters, dedicated to the washing of the organic phase obtained at the end of the extraction; and
- a third battery, referenced as 23, of 8 mixers-decanters, heated to 50° C., dedicated to the stripping of uranyl nitrate from the organic phase obtained at the end of the washing of this phase.

Were used:
- as an organic phase: a phase containing 1.5 mol/L of DEHiBA in TPH and circulating at a flow rate of 145 mL/hour in three batteries of mixers-decanters;
- as an aqueous phase A1: a solution containing 1.5 mol/L of nitric acid, 435 g/L of uranium (as uranyl nitrate), about 5,400 kBq/L (i.e. 6 ng/L) of thorium 234 stemming from the decay of uranium 238 as well as characteristic impurities (736 mg/L of iron, 359 mg/L of molybdenum, 258 mg/L of zirconium, 34 mg/L of vanadium and 106 mg/L of calcium), and circulating at a flow rate of 50 mL/hour in the battery 21;
- as an aqueous phase A2: a fraction of the solution exiting the battery 23, circulating at a flow rate of 6 mL/hour in the battery 22 and being added at this same flow rate to the aqueous phase A1 in the battery 21; and
- as an aqueous phase A3: a solution of heated distilled water and circulating at a flow rate of 75 mL/hour in the battery 23.

The ratios of O/A (organic over aqueous) flow rates in the batteries 21, 22 and 23 were therefore 2.6, 24 and 1.9, respectively.

After 24 hours of operation of the installation the test showed that it is possible to recover in the aqueous phase exiting the battery 23, more than 99% of the uranyl nitrate initially present in the aqueous phase A1 and at a concentration of 281.5 g/L, i.e. much greater than the recovered uranium concentration in the purification method of the prior art (130 g/L). The uranium losses in the aqueous phase exiting the battery 21 were estimated to be 0.2 mg/L.

Thorium 234 analyzed by γ spectrometry is again found quantitatively in the aqueous phase exiting the battery 21 (i.e. 100% of the initial thorium are recovered at the end of the test) and does not accumulate in this battery and this, without resorting to a specific complexing agent, thereby confirming the selectivity of DEHiBA for uranium relatively to thorium.

The organic phase exiting the battery 22 contains about 156 g/L of uranium, which is quantitatively stripped in the battery 23 by using a ratio of O/A flow rates of 1.9 in order to obtain a solution with 281.5 g/L of uranium.

Moreover the test showed that the uranyl nitrate was sufficiently decontaminated with respect to the main impurities present in the mining concentrates. The results have shown the presence of traces of iron, molybdenum, zirconium and calcium of less than 1 mg/L in the purified solution of uranyl nitrate and did not detect the presence of vanadium. The thorium measured in the purified uranyl nitrate at a concentration of $8.10^{-14}$ g/L is probably due to regeneration of thorium in the uranium sample by decay of this uranium and confirms the very low distribution coefficients of thorium which are obtained with an organic phase containing DEHiBA.

These values are listed in Table 2 hereafter and compared with the specifications of the ASTM C 788 standard.

TABLE 2

| Impurities in the purified uranyl nitrate solution | Mo | V | Zr | Ca | Fe |
|---|---|---|---|---|---|
| ASTM C 788 specifications (μg/g of uranium) | 1.4 | 1.4 | Sum < 500 | | |
| Test in mixers-decanters (μg/g of uranium) | 1.1 | <1 | 3.6 | 2.7 | 3 |

Moreover, FIG. 4 shows the profiles of the concentrations of the uranium, expressed in g/L, in aqueous and organic phases, as obtained experimentally and by calculations, in the different stages of the mixers-decanters.

In this figure, $[U(VI)]_{aq}$. exp. corresponds to the experimental concentrations of the uranium in the aqueous phase; $[U(VI)]_{org}$. exp. corresponds to the experimental concentrations of the uranium in the organic phase; $[U(VI)]_{aq}$. calc. corresponds to the calculated concentrations of the uranium in the aqueous phase while [U(VI)]$_{org}$. calc. corresponds to the calculated concentrations of the uranium in the organic phase.

The good agreement between the experimental and calculated values confirms the validity of the model of uranium extraction by DEHiBA elaborated in order to simulate the method of the invention.

The use of DEHiBA therefore allows recovery of the totality of the uranium present in the solution, at a concentration twice greater than that which is presently obtained industrially with TBP and sufficiently decontaminated from the main cation impurities present in mining concentrates and being a nuisance for subsequent enrichment operations while avoiding accumulation of the thorium in the extraction step.

CITED REFERENCES

[1] French patent application No. 2 642 562
[2] French patent application No. 2 642 561
[3] Al-Jallo et al., *J. Chem. Eng. Data* 1984, 29, 479-481
[4] Gasparini and Grossi, *Separation Science and Technology* 1980, 15(4), 825-844

The invention claimed is:

1. A method for purifying the uranium of a natural uranium concentrate containing at least one impurity selected from thorium, molybdenum, zirconium, iron, calcium, and vanadium, the method comprising:
    a) extracting the uranium present as uranyl nitrate from an aqueous phase A1 resulting from a dissolution of the natural uranium concentrate in nitric acid, said step of extracting comprising putting the aqueous phase A1 in contact with an organic phase non-miscible with water, which contains an extractant in an organic diluent, and then separating said aqueous and organic phases;
    b) washing the organic phase obtained at the end of step a), said step of washing comprising putting the organic phase obtained at the end of step a) in contact with an aqueous phase A2, and then separating said organic and aqueous phases; and
    c) stripping the uranyl nitrate from the organic phase obtained at the end of step b), said step of stripping comprising circulating the organic phase obtained at the end of step b) in an apparatus, as a counter current to an aqueous phase A3, and then separating said organic and aqueous phases,
    wherein the extractant contained in the organic phase is an N,N-dialkylamide and a ratio between flow rates at which the organic phase obtained at the end of step b) and the aqueous phase A3 circulate in the apparatus of step c) is greater than 1.

2. The method of claim 1, wherein the N,N-dialkylamide is selected from N,N-dialkylamides fitting formula (I) hereafter:

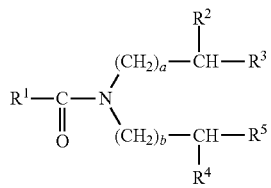

and wherein
    $R^1$ represents an alkyl group which is branched in the alpha or beta position of the carbonyl group and which comprises from 3 to 12 carbon atoms;
    $R^2$ and $R^4$, which may be identical or different, represent a linear or branched alkyl group comprising 2 to 4 carbon atoms;
    $R^3$ and $R^5$, which may be identical or different, represent a linear or branched alkyl group comprising from 1 to 6 carbon atoms; and
    a and b, which may be identical or different, are integers ranging from 1 to 6.

3. The method of claim 2, wherein the N,N-dialkylamide fits formula (I) wherein a and b both have the value 1 and $R^2$ and $R^4$ both represent an ethyl group.

4. The method of claim 3, wherein the N,N-dialkylamide is N,N-di-(2-ethylhexyl)-isobutyramide.

5. The method of claim 1, wherein the organic diluent is a $C_9$-$C_{13}$ isoparaffin or a mixture of $C_9$-$C_{13}$ paraffins.

6. The method of claim 1, wherein the concentration of the N,N-dialkylamide in the organic diluent is from 1 to 2 mol/L.

7. The method of claim 1, wherein the aqueous phase A1 comprises from 0.5 to 4 mol/L of nitric acid.

8. The method of claim 1, wherein the aqueous phase A2 is water.

9. The method of claim 8, wherein the aqueous phase A2 is distilled water.

10. The method of claim 4, wherein the aqueous phase A2 is an aqueous solution comprising from 0.01 to 1.5 mol/L of nitric acid.

11. The method of claim 1, wherein the aqueous phase A2 is a fraction of the aqueous phase obtained at the end of step c).

12. The method of claim 1, wherein the aqueous phase A3 is water.

13. The method of claim 12, wherein the aqueous phase A3 is distilled water.

14. The method of claim 1, wherein the aqueous phase A3 is an aqueous solution comprising at most 0.01 mol/L of nitric acid.

15. The method of claim 1, wherein the ratio between the flow rates at which the organic phase obtained at the end of step b) and the aqueous phase A3 circulate in the apparatus of step c) is equal to or greater than 1.5.

* * * * *